United States Patent
Bailey et al.

(10) Patent No.: US 6,440,205 B1
(45) Date of Patent: Aug. 27, 2002

(54) PAVING BINDERS AND MANUFACTURING METHODS

(75) Inventors: William R. Bailey, Vancouver, WA (US); Norm D. Pugh, Wilton, CA (US); William C. McBee, Lebanon, OR (US)

(73) Assignee: Rock Binders, Inc., Vancouver, WA (US)

( * ) Notice: Subject to any disclaimer, the term of this patent is extended or adjusted under 35 U.S.C. 154(b) by 0 days.

(21) Appl. No.: 09/576,476

(22) Filed: May 23, 2000

(51) Int. Cl.[7] .................................................. C09D 195/00
(52) U.S. Cl. ...................................... 106/275; 106/285
(58) Field of Search ................................. 106/275, 285

(56) References Cited

U.S. PATENT DOCUMENTS

| | | | |
|---|---|---|---|
| 748,019 A | 12/1903 | Rubitschung | |
| 3,026,568 A | 3/1962 | Moar | |
| 3,738,853 A | 6/1973 | Kopvillem et al. | 106/274 |
| 3,758,035 A | 9/1973 | Ushiku et al. | 241/73 |
| 3,970,468 A | 7/1976 | Garrigues et al. | 106/274 |
| 3,997,355 A | 12/1976 | Santucci et al. | 106/275 |
| 4,225,353 A | * 9/1980 | Beaudoin et al. | 106/275 |
| 4,239,547 A | 12/1980 | McBee et al. | 106/274 |
| 4,756,763 A | 7/1988 | Etnyre | 106/281 |

OTHER PUBLICATIONS

CAPLUS 1968:88848, Mitrofanov et al, "Petroleum Asphalt", Sep. 1967.*

CAPLUS 1990:124203, Zolotorev et al, "Asphalt Concrete Mix", Dec. 1998.*

William C. McBee, "Potential and Properties of Sulfur Asphalt Paving," Fourth International Symposium, Sulphur Markets, (Mar. 23–25, 1994).

G. Mohammed Memon, John G. Boone, and Brian H. Chollar, "Furfural Substitutes for Chemical Modification of Asphalt;" Physical Properties of Asphalt Cement Binders, STP 1241, (1995), No Month Provided.

Hussain U. Bahia and David A. Anderson, "The Development of the Bending Beam Rheometer; Basics and Critical Evaluation of the Rheometer;" Physical Properties of Asphalt Cement Binders, STP 1241 (1995), No Month Provided.

H.U. Bahia and D.A. Anderson, "The New Proposed Rheological Properties of Asphalt Binders: Why are they Required and How do they Compare to Conventional Properties;", Physical Properties of Asphalt Cement Binders, STP 1241 (1995), No Month Provided.

* cited by examiner

*Primary Examiner*—David Brunsman
(74) *Attorney, Agent, or Firm*—Workman, Nydegger & Seeley

(57) ABSTRACT

Solid, low-cost paving binder prepared by admixing sulfur, paving grade asphalt (AC) asphalt, and a siliceous filler such as fly ash and silica material, and solidifying the product into preferably flaked, pellet or pastille forms. The solid paving binder has non-sick non-flow properties within a wide range of ambient temperatures, and it can be stored solid for subsequent use in paving applications.

33 Claims, 1 Drawing Sheet

PAVING BINDERS AND MANUFACTURING METHODS

BACKGROUND OF THE INVENTION

1. The Field of the Invention

The present invention relates generally to paving binder compositions and methods for manufacturing such compositions. More specifically, the present invention relates to high sulfur paving binder compositions that contain a sulfur plasticizer such as asphalt and which retain non-flow properties within a broad range of ambient temperatures, and to methods for producing binders with these compositions.

2. Present State of the Art

Paving material typically includes a binder and an aggregate. Although the binder is typically the minority component in paving materials, most of the pavement properties that relate to its longevity depend on the properties of the binder.

The binder component is generally an asphalt-based composition that may include some additives. Asphalt is described as a dark brown to black cementitious material, which has a solid, semisolid or liquid consistency, in which the predominant constituents are bitumens that occur in nature as such or which are obtained as residue in refining petroleum. Natural deposits in which asphalt occurs within porous rocks are known as rock asphalts. Petroleum asphalt is part of the residue that is obtained in the distillation of petroleum. In particular, asphalt cement is petroleum asphalt that is refined to meet specifications for paving, industrial, and special purposes.

The aggregate component of paving material is typically any hard, inert, mineral material that is used for mixing in graduated fragments. The aggregate component may include sand, gravel, crushed stone, coral, and slag.

One of the limitations to the use of asphalt as a binder for paving materials is that it softens and flows within a wide range of ambient temperatures. This limitation makes the transport of this type of conventional asphalt-based materials difficult or even impossible, and it can also give rise to serious environmental problems. Nevertheless, convenient transport of binder materials is desirable because paving takes place at sites that are generally far away from the locations where the asphalt is available. Transporting binder materials in the form of smaller-sized, solid, non-sticky and non-flowing materials facilitates the delivery of paving binders even when they are transported to sites that are far away from the asphalt sources.

Asphalt and sulfur are used in the manufacture of binders and they are typically transported in liquid form. This type of transport requires specialized containers and conditions. It is desirable to manufacture binders that incorporate the required amounts of asphalt and sulfur and they remain in solid, non-sticky and non-flowing form over a wide range of ambient temperatures, so that such binders can be conveniently transported over long distances by conventional means of transportation for common solids.

Asphalt additives are used to render the binder material less flowable at ambient temperatures. In particular, sulfur is one of such additives that has been incorporated into the binder as a minority binder constituent. Mixing asphalt with sulfur, however, presents a number of problems. Some of these problems derive from the different densities of asphalt and sulfur. In certain mixtures, sulfur separates due to its greater density from the asphalt. As a result, the sulfur depleted binder then retains the softening and flowing properties of asphalt, which make the handling and transportation of the binder difficult or impossible. Finely divided calcium-based materials have also been used in an attempt to keep the sulfur additive homogeneously dispersed in asphalt. For example, crushed limestone has been used for this purpose. However, the use of calcium-based materials including CaOH or low density calcium-based filters is believed to lead to the formation of calcium sulfides and polysulfides that are detrimental to the pavement longevity.

Furthermore, it has been acknowledged that sulfur-rich binders may detrimentally affect the quality and longevity of the paving material. In addition, sulfur has been viewed as a constituent that would unacceptably increase the cost of binder materials to the point of rendering them prohibitively expensive if the amount of sulfur in the binder exceeded a certain limit. For example, the sulfur concentration by weight in binders is not significantly above 50%, and the art recognizes that a sulfur-to-asphalt weight ratio greater than 1.5:1 increases the cost and may make the binder so sulfur-rich as to detrimentally affect the asphalt. Unless indicated otherwise, concentrations given as percentages are hereinafter understood as being weight percentages. Furthermore, sulfur-asphalt mixtures that contain more than 52% of sulfur are conventionally described as being too sensitive to compaction temperatures below 115.5° C. (240° F.).

In addition to economic considerations regarding the use of sulfur as an additive in paving binders, the use of asphalt is also related to economic factors. For example, the use of asphalt as the major constituent in paving binders is negatively affected by the often fluctuating petroleum production patterns. Further, limited petroleum supplies may threaten, in the long term, the viability of paving binders in which asphalt is a major constituent. Profitable utilization of petroleum products is another factor that detrimentally affects the use. of asphalt as a majority constituent in paving binders. For example, maintaining, renovating and protecting the surfaced highways and streets in the United States requires approximately thirty million tons of asphalt cement annually. Asphalt cement was available in the past at a reasonable cost because asphalt cement is a residue in petroleum refining and certain petroleum refining residues could only be economically utilized for the production of asphalt cement. However, higher percentages of petroleum are utilized nowadays for the production of other more profitable forms of petroleum products, such as petroleum coke. As this trend continues, the price of asphalt cement is expected to increase even under constant demand. This expectation is supported by the evolution of the average price of asphalt cement over the past thirty-two years, a period during which the price has risen from approximately $23/ton in 1968 to approximately $152/ton in 2000 (through February), an increase of about 561%. It is generally recognized, however, that there is currently no economical paving binder that can be substituted for asphalt cement, and that there is no low asphalt paving binder that can effectively replace high asphalt paving binders.

Accordingly, there is a need for paving binders which include the following characteristics. First, these binders can be manufactured in forms that are non-sticky and non-flowing within a wide range of ambient temperatures at which storage and transport is effectuated. Binders with these non-sticky and non-flowing properties can be conveniently transported over long distances while avoiding pollution problems that would derive from the emissions and spills of other forms of binders that soften and flow at ambient temperatures. Second, asphalt in these paving binders should be incorporated at most as a minority component to reduce petroleum dependency and cost. Third, the additives used in the paving binders should not substantially incorporate constituents that, whether directly or when combined with other binder constituents, are known to detrimentally affect the quality and longevity of the pavement. Finally, paving binders should include additives which are not obtained at the cost of depleting resources that can be used for other purposes, but which absorb waste substances that would otherwise present disposal problems.

OBJECTS AND BRIEF SUMMARY OF THE INVENTION

The present invention has been developed in response to the present state of the art and, in particular, in response to problems and needs that have not been solved heretofore.

It is an object of the present invention to provide paving binder formulations that reduce the amount of asphalt required and methods to manufacture such paving binders.

It is a further object of the present invention to provide paving binders in which sulfur is a majority component at a concentration significantly higher than asphalt. It is also an object of the present invention to provide methods for manufacturing such paving binders.

It is an additional object of the present invention to provide paving binders that can be manufactured in solid forms such as pastilles and slates that do not flow and that do not stick at temperatures within a wide range of ambient temperatures. The non-stick and non-flow features of the paving binders of the present invention allow for the advantageous handling of the paving binders of the present invention in forms that do not agglomerate. It is also an object of the present invention to provide methods for manufacturing such paving binders.

It is an additional object of the present invention to provide paving binders that positively contribute to resistance to the pavement main failure modes such as, by way of example only, rutting, fatigue cracking, thermal cracking, bleeding and shoving. In particular, it is a feature of the compositions of the paving binders of the present invention not to include constituents that are known to cause the pavement to acquire undesirable characteristics that detrimentally affect the longevity of the pavement including, by way of example only, excessive brittleness and propensity to stripping.

It is also an object of the present invention to provide methods for manufacturing such paving binders.

To achieve the foregoing objects, and in accordance with the invention as embodied and broadly described herein, paving binder compositions according to the present invention comprise sulfur at a concentration of not less than 60%, a carbon-based plasticizer such as asphalt, and a fine mineral constituent such as fine silica material, fly ash and mixtures thereof. Some embodiments of the paving binder according to the present invention comprise a hydrocarbon-based plasticizer that includes a mixture of asphalt and at least one organic additive. According to the present invention paving binders are manufactured by mixing at least sulfur, a hydrocarbon-based plasticizer and a fine mineral constituent and solidifying the fluid mixture to form paving binder in any one of a plurality of forms such as pastilles and slates.

These and other objects, features, and advantages of the present invention will become more fully apparent from the following description, drawings, and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
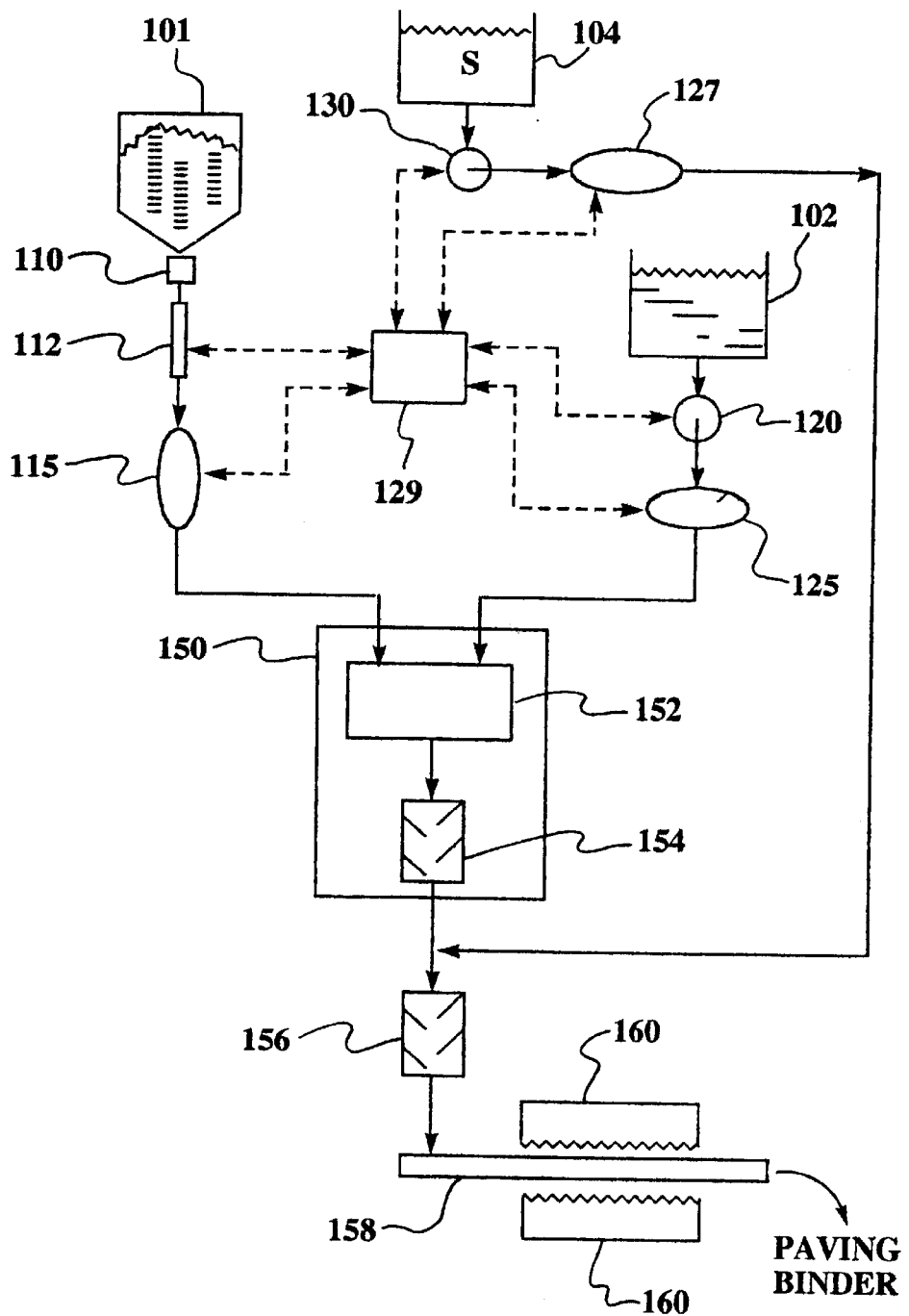
FIG. 1 is a schematic block diagram of one embodiment of the methods for producing paving binders according to the present invention

The present invention is directed to the production of paving binders that contain sulfur and asphalt, where the asphalt is a minority constituent when compared with the concentration of sulfur. Paving binders according to the present invention also contain a substance such as fly ash as stiffener and mastic material former. Embodiments of the methods for manufacturing paving binders according to the present invention comprise mixing liquid asphalt and a substance such as fly ash and further mixing with liquid sulfur, subsequently forming pastilles, slates, pellets, chips, briquettes or other small forms of finished paving binder product that are suitable for storage and transportation at ambient temperature because of their non-flow properties within a wide range of ambient temperatures. The finished paving binder product according to the present invention can be stored at the production site or at a remote site and can be transported and stored in piles or within containers such as sacs, tanks, and barrels while the individual small forms of finished product remain loose, non-flowing, non-sticky and devoid of the emissions that fluid asphalt or fluid sulfur would generate.

Applications of embodiments of the paving binder according to the present invention include their use in hot mix plants where the paving material such as asphalt concrete is produced for transportation and delivery to the paving site. Other applications of the paving binder according to the present invention include its use in road site paving operations, either alone or in combination with other paving materials. Still another use comprises the on-site or remote site storage. Storage of the paving binder of this invention permits its accumulation in large quantities so that it can subsequently be shipped in large quantities to remote locations. The properties of the various embodiments of the paving binder according to the present invention are such that the paving binder can effectively be shipped over long distances, such as by transatlantic and transcontinental shipments by any one of a variety of conventional means, such as rail cars, trucks, ships and airplane. Properties that facilitate the storage and shipment of the inventive paving binder in large quantities include the non-sticky and non-flow properties according to the present invention.

FIG. 1 schematically shows a flow diagram of one possible embodiment of a process for manufacturing paving binders according to the present invention. In one embodiment, the paving binder comprises fly ash, a fine mineral constituent, which is stored as feed material in container 101; asphalt, a carbon-based plasticizer, which is stored as liquid feed material in tank 102; and sulfur, which is stored a liquid feed material in tank 104. It is understood that tanks 102 and 104 are appropriately configured for the storage and delivery of liquid asphalt and liquid sulfur, respectively. Accordingly, these tanks can be provided with stirrers and heating systems that are not shown in the embodiment depicted in FIG. 1 because the melting points of asphalt and sulfur are well known and the devices for melting and keeping these substances in liquid form are also well known in the art.

Fly ash is a finely divided mineral residue that is obtained as a waste in power plants that burn pulverized bituminous coal. Coal consuming electrical power plants are a prime producer of fly ash in the United States. These plants have to dispose of an enormous amount of fly ash every year, which increases the costs of producing electricity and also generates disposal problems. The paving binders and manufacturing methods of the present invention effectively absorb the fly ash that is produced in plants that generate electricity by burning coal, and use the fly ash as a constituent in paving binders.

Fly ash is the preferred fine mineral constituent of the paving binder of the present invention, but paving binders can also be made according to the methods of the present invention with another fine mineral constituents, such as silica-based materials, and in particular with silica material and with mixtures of fly ash and silica material. Although fine mineral constituents with a wide range of particle size can be used in the paving binders and the manufacturing methods according to the present invention, a particle size characterized by the fraction that passes through a sieve with a mesh number 200 or finer is preferred, such as, by way of example and not limitation, silica flour. Examples of such fine mineral constituents are type A silica material, type F silica material, and type F fly ash, and a ceramic clay such as kaolin.

Asphalt is the preferred hydrocarbon-based plasticizer according to the present invention, and asphalt cement is the most preferred form for the plasticizer used in the embodiments of paving binder according to the present invention. Asphalt cement is commonly abbreviated with the terms AC-xx asphalt, and it is provided by petroleum companies. The notation "xx" in the description of an AC asphalt represents a numeral related to the asphalt viscosity. Asphalts such as AC-20 and AC-10 asphalts are preferred forms of asphalt to be used as hydrocarbon-based plasticizers according to the present invention. Other forms of asphalt that are envisaged as constituents in paving binder formulations according to the present invention include, by way of example and not limitation, AC-1.75, AC-2.5, AC-5, AC-30, AC-40, AC-80, and AC-120 asphalts. Other hydrocarbon-based plasticizers that are envisaged as constituents in paving binder formulations according to the present invention include, by way of example and not limitation, heavy crude oil, fuel oil, and mixtures of substances such as heavy crude oil and fuel oil with at least one of the AC asphalts referred to above.

The use of the AC-xx grading system to designate exemplary embodiments of asphalt that can be used in the context of the present invention is provided as an example and is not intended to limit the types of asphalt to this particular grades. Asphalt characterized according to other designations, such as PG grades are also envisaged with the scope of hydrocarbon-based plasticizers according to the present invention. Furthermore, substances such as bitumen and gilsonite are also envisaged as examples of hydrocarbon-based plasticizers in the context of the present invention.

It is envisaged that paving binders according to the present invention can also be prepared with other hydrocarbon-based plasticizers in which asphalt is the majority component added to the plasticizer mixture. These plasticizers include, by way of example and not limitation, the products of mixtures such as a mixtures of asphalt and tall oil pitch, mixtures of asphalt and cyclic saturated hydrocarbons, mixtures of asphalt and cyclic unsaturated hydrocarbons, mixtures of asphalt and polycyclic saturated hydrocarbons, mixtures of asphalt and unsaturated polycyclic hydrocarbons, and mixtures of asphalt and tar.

Other hydrocarbon-based plasticizers that are envisaged as constituents in paving binder formulations according to the present invention include without limitation the products of mixtures of at least one of the asphalts referred to above and polymeric or polymerizable materials in which asphalt is the majority component added to the plasticizer mixture. Examples of such polymeric or polymerizable materials include, by way of example and not limitation, styrene monomer (vinyl toluene), polyethylene terephthalate (PET), ethyl vinyl acetate (EVA), Exxon 101, and Exxon 103, which are proprietary materials, or other vinyl aromatics Still other hydrocarbon-based plasticizers that are envisaged as constituents in paving binder formulations according to the present invention include, by way of example only, the products of mixtures of at least one of the AC asphalts referred to above and at least one heterocyclic compound such as furan, dihydrofuran, and derivatives of such heterocyclic compounds, where asphalt is the majority component added to the plasticizer mixture. In addition to furan and dihydrofuran, these heterocyclic compounds include furfural, and 3-(2-furyl)acrolein.

Other hydrocarbon-based plasticizers that are envisaged as constituents in paving binder formulations according to the present invention include the products of mixtures of at least one of the AC asphalts referred to above and at least one aliphatic, olefinic or aromatic substance.

In one embodiment, sulfur is most preferably elemental sulfur, which can be commercial grade, crystalline or amorphous. Sources that provide sulfur suitable for the compositions and methods of the present invention include primary sulfur sources and recovered sulfur sources.

In one embodiment depicted in FIG. 1, feed material from container 101 is delivered through a weigh hopper with an auto-drop feature 110 and subsequently by auger 112 to mixing unit 150. One example of container 101 is a bulk silo, but other storage devices that are configured for controllably deliver fine material are envisaged to embody container 101. Auger 112 may be replaced in other embodiments of the present invention by a suitable pump. Further, other embodiments are contemplated to operate with a combination of a pump and auger, depending on the size and flow characteristics of the feed material in container 101. In one embodiment of the present invention, the feed material that is transported from container 101 to mixing unit 150 is circulated so that the material flow interacts with measuring device 115, which may in one embodiment be a metering device. Measuring device 115 may alternatively be embodied by a belt scale or an equivalent measuring device. It will be appreciated by one skilled in the art that measuring device 115 could be included as part of auger 112.

Feed material from tank 102 is delivered to mixing unit 150. This delivery is accomplished in one embodiment with the aid of a suitable pump 120, although liquid asphalt could also be delivered as a gravity-driven fluid flow. As feed material is delivered from tank 102 to mixing unit 150, the fluid flow is circulated so that the material flow interacts with measuring device 125, such as a mass-flow meter. In one embodiment, liquid asphalt is preferably kept in tank 102 at a temperature range of about 115° C. (about 229° F.) to about 180° C. (about 356° F.). More preferably, tank 102 has a temperature range of about 140° C. (about 284° F.) to about 160° C. (about 320° F.), and most preferably has a temperature of about 149° C. (about 300° F.). It will be appreciated by one of ordinary skill in the art that when feed material from tank 102 at a temperature above about 310° F. is mixed with liquid sulfur, this operation may have to be performed in a controlled environment, such as a sealed container, so that evolved $H_2S_{(g)}$ does not present safety problems. The liquid asphalt in tank 102 is stirred with multiple agitators and the temperature is maintained with the heat provided by a heater such as a hot oil jacket surrounding tank 102.

In one embodiment, illustrated in FIG. 1, mixing unit 150 is embodied by two subunits. In this embodiment, the material from container 101 and the fluid from tank 102 are delivered to wetting box 152, which in one embodiment is a gravity feed wetting box. The mixture is subsequently transferred to mixer 154. One possible type of mixer 154 an in-line mixer such as the mixer known by the name Komax. It will be appreciated that various other embodiments of mixing unit 150, wetting box 152, and mixer 154 may be utilized.

The mixture produced in mixing unit 150 is a type of "asphalt mastic." As used herein, the term "asphalt mastic" is used to describe a mixture of asphalt and fine mineral material in such proportions that the material can be poured hot and compacted by troweling, if so desired. The terms "mastic material" refer hereinbelow to a mixture of a hydrocarbon-based plasticizer with a fine mineral constituent that has properties such as those described for asphalt mastic, which is an embodiment of a mastic material.

Feed material from tank 104 is further mixed with the mixture produced in mixing unit 150. Delivery of this feed material is accomplished in one embodiment with the aid of a suitable pump 130, although liquid sulfur could also be delivered as a gravity-driven fluid flow. As feed material is delivered from tank 104, the fluid flow is preferably circulated so that the material flow interacts with measuring device 127, such as a mass-flow meter.

As known in the art, fluid materials such as liquid sulfur and liquid asphalt can be circulated as such fluids by maintaining the appropriate temperature and pressure conditions in the pipes. These conditions are achieved in most environments by properly insulating or heat tracing the pipes through which these liquids circulate. Other measures that can be adopted to achieve the same goal are well known in the art.

In one embodiment of the present invention, in an optional step, the feed material from tank 102 is preplasticized by adding to such material in tank 102 a preplasticizing substance such as at least one of the substances styrene monomer (vinyl toluene), polyethylene terephthalate (PET), ethyl vinyl acetate (EVA), Exxon 101, and Exxon 103. In another embodiment of the present invention, the feed material from tank 104 is optionally preplasticized by adding to such material in tank 104 a preplasticizing substance such as at least one of the substances styrene monomer (vinyl toluene), PET, EVA, Exxon 101, and Exxon 103, which are proprietary material, or other vinyl aromatics. Still in another embodiments of the present invention, the feed material from tank 102 is optionally preplasticized in tank 102 and the feed material from tank 104 is preplasticized in tank 104 as indicated regarding the preplasticization of each one of such feed materials. It will be appreciated that adding the preplasticizer substance is an optional step and can be omitted entirely.

The fluid mixture produced in mixing unit 150 is mixed with the liquid sulfur from tank 104 in mixer 156. In one embodiment, mixer 156 is an in-line mixer, such as the mixer known by the name Komax.

Embodiments of the fine mineral constituent according to invention are fillers for the fluid paving binder that permit its solidification in a homogeneous form. Fluid paving binder compositions according to the present invention are preferably processed in a gel form that behaves as a thixotropic fluid when mixed. Low to medium shear mixing is preferable to maintain this preferred fluid condition, and high shear mixing conditions generally cause the thixotropic characteristics to deteriorate or even disappear. One advantage of the gel form of the fluid paving binder is that no separation, or even development of inhomogeneity due to settling of dense material, has been observed for a period of up to two hours. Whereas losing the gel form is believed not to be critically detrimental, the gel form is a very advantageous feature of the new compositions according to the present invention that greatly facilitates the handling of the fluid paving binder and the subsequent formation of discrete solid paving binder units with the strength, non-sick and non-flow properties that characterize the paving binder compositions of the present invention.

Mixer 156 produces a feed material that is used to form finished paving binder in a variety of forms that includes, by way of example and not limitation, pastilles, slates, pellets, chips, briquettes or other forms of finished paving binder product that are suitable for storage and transportation. In one embodiment, these forms of finished paving binder product have a smaller manageably size. By way of example only, in one embodiment the finished paving binder products are sized so that each unit exposes a surface area within the range from about 0.25 in$^2$ to about 4 in$^2$. It is contemplated that various other sizes and forms of finished paving binder products may be produced.

In one embodiment, feed material from mixer 156 is formed into solid units such as, by way of example only, pellets, pastilles, slates and chips. In contrast, conventional paving binders are not known to be available in any of these useful forms. Slates and chips are formed according to the embodiment shown in FIG. 1 by circulating the feed material produced in mixer 156 through a cooling system 160, so that the fluid hardens as it is transported by conveyor 158 into a brittle material that subsequently breaks into discrete units, including units with a fairly small size described above. Pastilles may be formed by subjecting the fluid obtained from mixer 156 to known pastille-making processes such as rotoforming, and processing with pastille making devices such as the devices known by the name AccuDrop and Sandvik rotoformer. Pellets are formed by subjecting the fluid obtained from mixer 156 to treatment with conventional pelletizers. Flakes are formed by subjecting the fluid obtained from mixer 156 to treatment with conventional devices such as a rubber, composite, or metal belt.

Paving binder according to the present invention is preferably manufactured by mixing about 82% sulfur, about 9% asphalt, and about 9% fine mineral constituent. Paving binders according to the present invention are manufactured by mixing sulfur in amounts that range from about 60% to about 98%, with asphalt cement in amounts that range from about 1% to about 30%, and fine mineral constituent such as fly ash, silica material, and mixtures of fly ash and silica material, to balance, but generally ranging form about 1% to about 33%. Preferable ranges are from about 70% to about 90% of sulfur, from about 2.5% to about 20% of asphalt, and fine mineral constituent to balance, but generally ranging from about 2.5% to about 20%. More preferable ranges are from about 75% to about 90% sulfur, from about 5% to about 12% of asphalt, and fine mineral material constituent to balance, but generally ranging from about 5% to about 12%. Total preplasticizing substance can range in embodiments of the present invention from 0% to about 10%.

It is understood that material flow lines in the diagram shown in FIG. 1 are in practice embodied by an auger system or equivalent device when the rheology of the circulating fluid requires such devices to cause or facilitate the circulation. Furthermore, material flow line connections in the embodiment sketched in FIG. 1 are built with the suitable ports that are known in the art. For example, the fluid mixture produced in mixing unit 150 may be fed into the liquid sulfur feed line through a conventional vortex injector port.

Suitable combinations of compacting, crushing, comminuting devices and other devices to further control and standardize the size of the finished paving binder can be implemented instead of or in addition to conveyor 158 and cooling system 160. Nevertheless, one of the advantages of the compositions and processes of the present invention is that the finished paving binder can be easily produced with a reduced set of devices and with less equipment than it would otherwise be necessary for the production of other binders.

In one embodiment of the process for making paving binder according to this invention, cooling system 160 is a water-based cooling system, including water baths and a water flow systems, such as a water sprinkling system, that lowers the temperature of the fluid feed produced in mixer 156 as it is transported by conveyor 158. In one embodiment, the water based cooling system is configured in a way such that the cooling water is not substantially in direct contact with the fluid paving binder composition. This configuration can be achieved, for example, by circulating the paving binder composition obtained from mixer 156 along a conveyor, so that the outer bottom portion of the conveyor is in contact with the cooling water. Heat is then transferred from the binder composition within the conveyor to the cooling water through the conveyor material. Examples of conveyors that are used in the context of this invention include U-shaped conveyors, flat conveyors, stainless steel belt conveyors, and rubber conveyors. In addition, a fan or plurality of fans can also be used as part of the cooling system. Depending on the specific embodiment of the cooling system and how the fluid paving binder from mixer 156 is fed to it, solidification is typically achieved in about 1 minute to 10 minutes.

In one embodiment of the present invention, fluid feed produced in mixer 156 is fed to a pelletizing unit, such as a pelletizing drum unit, to produce solid paving binder in the form of pellets.

Embodiments of the paving binder produced according to the present invention have excellent non-flow behavior at temperatures below about 77° C. (about 170° F.), and no agglomeration of the individual units, such as pastilles, slates, pellets or other forms, of the paving binder of this invention have been observed at temperatures as high as about 79° C. (about 175° F.). Although the melting point of the paving binder of the present invention depends on the composition of each embodiment, the melting point is generally above about 82° C. (about 180° F.).

Processes for manufacturing paving binders according to this invention, such as the embodiment schematically shown in FIG. 1, are preferably configured for an automated control of the amount of constituents and process conditions. For example, FIG. 1 shows process control unit 129 that receives input from and provides regulatory feedback to auger 112, pumps 120 and 130, measuring devices 115, 125 and 127, and auger and/or pump 112. The exchange of signals to and from process control unit 129 that may be used to implement the acquisition of information and provide the regulatory feedback is generally represented in FIG. 1 by the dash lines. In one embodiment, process control unit 129 may be a computerized constituent ratio control unit. Automated process control can be achieved in other embodiments by a process control unit that also controls mixing unit 150, mixer 156, and the system for hardening and sizing the fluid feed that is obtained form mixer 156 to form finished paving binder product.

The paving binder produced according to the compositions and methods of the present invention is a high strength, durable, low cost paving binder product that can be stored for future use in paving applications. Paving binders according to the present invention achieve high strength in the aggregate mixture upon cooling to ambient temperatures and the strength further increases upon aging. A possible explanation of this increase in strength upon aging is believed to be based on solid state nucleation and growth of sulfur crystals in the material. Furthermore, the plasticizer effects of asphalt are believed to impede the development of crystals whose presence would be detrimental to the pavement into which binder with such crystals had been incorporated.

The strength of embodiments of the paving binder according to this invention is already very high upon solidification, reaching generally about 80% of the ultimate strength after a period of about 24 hours after solidification. The resulting strength permits the various embodiments of the paving binder of this invention to be stored in stockpiles up to approximately 12 m (40 feet) high.

The strength of embodiments of the paving binder according to the present invention also provides excellent resistance to thermal cracking. As discussed more extensively below, thermal cracking is the predominant failure mode at temperatures near and below 0° C., and pavement resistance to thermal cracking depends mostly on the resistance to thermal cracking of the binder that is utilized in the pavement manufacture. Because of the high internal strength of the paving binder of the present invention, resistance to thermal cracking of pavements that incorporate paving binder according to the present invention is also high.

The paving binder of the present invention is manufactured and delivered to the hot-mix plant in any one of the solid forms discussed herein above in lieu of the conventional hot liquid state. Embodiments of the paving binder of the present invention may also be used in a hot-mix plant by introducing them through the recycled asphalt pavement (RAP) collar in a drum hot-mix plant or pug mill in a batch process hot-mix plant, thus eliminating the need for hot asphalt storage and heating. Consequently, emissions from hot asphalt are also eliminated.

The compositions and manufacturing methods of the present invention permit the effective use of fly ash and sulfur supplies that would otherwise present disposal problems. For example, sulfur is a by-product from petroleum refining and natural gas processing that is obtained to offer fuels that comply with environmental regulations and specifications for other manufacturing processes. Recovered sulfur production has increased steadily over the past twenty-five years and currently is creating an imbalance between sulfur supply and demand which results in an excess of available sulfur. Because of this imbalance and future recovery operations, and in contrast with the prices expected regarding the price of asphalt, the price of sulfur is expected to follow a decreasing trend. Since 1970, the cost of recovered sulfur has remained below 56% of the price of asphalt, a cost ratio that is considered the break-even point for substitution of asphalt for sulfur. A significant price differential currently exists with the average price of recovered sulfur approximately 35% of the price of asphalt. These average prices are obtained from surveys, which report generally widely varying prices depending on location.

The foregoing discussion of the prices of asphalt and sulfur and their respective expected trends indicate that the present invention solves the compositional and manufacturing problems of a new form of paving binder. This solution is such that it beneficially utilizes the economic factors regarding the objection of asphalt and sulfur.

The finished paving binder product can subsequently be stored at or near the production site or at a remote site, it can be used alone or in combination with additional paving material at road sites, and it can be shipped to a hot mix plant where the paving binder of this invention is mixed with additional paving materials to manufacture asphalt pavements and surface treating materials. Among the asphalt pavements, asphalt concrete is a high quality, thoroughly controlled hot mixture of asphalt cement and well-graded, high quality aggregate, that is thoroughly compacted into a uniform dense mass.

Embodiments of the paving binder according to the present invention have a very long shelf life in storage sites because of the solid nature of these embodiments and the lack of a temperature control system. Furthermore, these embodiments are a convenient choice of binder to be used at remote sites because transporting liquid asphalt to remote sites is generally expensive and difficult. Embodiments of the paving binder according to the present invention can be shipped conventionally by rail, truck, ship or air over long distances, such as by transatlantic and transcontinental shipments. Embodiments of the paving binder according to the present invention provide for safer transportation of the binder because of the solid nature of the paving binder, thus eliminating the risk of hot asphalt transportation spills.

The use in the hot-mix plant of embodiments of the paving binder according to the present invention eliminates the need for stability testing during the hot-mix design process because the paving binder produces a mix with stabilities that are higher than can be measured with todays conventional testing equipment. Furthermore, because of the ongoing compatibility of the constituents introduced by the paving binder and the other elements in the hot mix, the stabilities continue to increase over time without losing hot and cold temperature properties. Hot-mix stability, however, is not a design characteristic that can be conveniently measured. As a result, the hot mix is typically designed for voids and workability, using conventional designs, such as Marshall, Hveem and Superpave, as starting point.

One possible embodiment of a process according to the present invention, as schematically shown in FIG. 1, displays a configuration of devices to first mix asphalt and fine mineral constituent, and subsequently incorporate sulfur into this mixture. Mixing at each stage takes place to an extent that is sufficient to thoroughly interdisperse the constituents in each mixture. In other embodiments of this invention sulfur, asphalt and fine mineral constituent are mixed together in a suitable vessel or apparatus at a temperature range of about 93° C. (about 200° F.) to about 204° C. (about 400° F.) for a sufficient time to ensure thorough mixing and interaction of the paving binder constituents. More preferably, the temperature range in which sulfur, asphalt, and fine mineral constituents are mixed together in a suitable vessel or apparatus is in a temperature range of about 121° C. (about 250° F.) to about 160° C. (about 320° F.). Most preferably the temperature range from about 132° C. (about 270° F.) to about 149° C. (about 300° F.). These ranges of mixing temperatures also apply to the temperatures at which constituents are mixed in mixing unit 150. Depending on the composition and characteristics of the constituents, mixing in this batch mode can take from about 15 minutes to about 2 hours, and in any case, mixing is performed until the constituents are thoroughly interdispersed in the mixture and a gel is formed.

EXAMPLES

To date, numerous paving binder compositions have been prepared and tested to develop and to offer exemplary embodiments of the present invention. Below are specific examples of paving binder compositions and tests of mixtures of paving binder compositions with aggregate material to form asphalt cement and other paving materials. Additionally, a number of hypothetical, or "prophetic", examples have been included based on actual paving binder compositions that have been designed or which would be expected, based on experience, to possess the properties described hereinafter. The actual examples are written the past tense, while the hypothetical examples are written in the present tense in order to distinguish between the two.

Example 1

60% sulfur, 15% type F fly ash, and 25% AC-10 asphalt cement were mixed together for a total time of one minute at about 140° C. (about 284° F.) and then cast into slate approximately 0.63 cm (about 0.25 in) thick. After cooling, the slate was broken up into pieces not bigger than forms which would have their length and width approximately equal to their thickness. This paving binder was mixed with graded mineral aggregate in relative amounts of about 5% of paving binder and 95% of aggregate, and the mixture was formed into Marshall-type briquettes, which had a stability of 3000 pounds and a flow of 8 at 50 blows.

Example 2

80% sulfur, 10% type F silica flour, and 10% AC-10 asphalt cement were mixed together for a about one minute at about 140° C. (about 284° F.) and then cast into slate approximately 0.63 cm (about 0.25 in) thick. After cooling, the slate was broken up into pieces not bigger than forms which would have their length and width approximately equal to their thickness. This paving binder was mixed with graded mineral aggregate in relative amounts of about 5% of paving binder and 95% of aggregate, and the mixture was formed into Marshall-type briquettes, which had a stability of 5000 pounds and a flow of 8 at 2 blows.

Example 3

A composition like that described in Example 2 was prepared with type A silica flour instead of type F silica flour.

Example 4

Compositions like those described in Examples 1–3 were prepared with AC-20 asphalt instead of AC-10 asphalt.

Example 5

A composition was prepared as described in Example 1 with 65% sulfur, 12% type F fly ash, and 23% AC-10 asphalt.

Example 6

A composition was prepared as described in Example 3 with 85% sulfur, 8% type F silica material, and 7% AC-10 asphalt.

Example 7

A composition was prepared as described in Example 3 with 75% sulfur, 13% type F silica material, and 12% AC-10 asphalt.

Example 8

Compositions like those described in Examples 6–7 were prepared with type A silica material instead of type F silica material.

Example 9

Compositions like those described in Examples 5–8 were prepared with AC-20 asphalt instead of AC-10 asphalt.

Example 10

Compositions like those described in Examples 1–2, 4–7, 9 are prepared with the corresponding amount of fine mineral constituent replaced by a 50—50 mixture of type F silica material and type F fly ash.

Example 11

Compositions like those described in Examples 1–2, 4–7, 9 are prepared with the corresponding amount of fine mineral constituent replaced by a 50—50 mixture of type A silica material and type F fly ash.

Example 12

This example describes a set of formulations that refer to a variety of asphalt cement types. Compositions such as those described in the foregoing examples in which the asphalt constituent is AC-10 or AC-20 asphalt are prepared with at least one of AC-1.75, AC-2.5, AC-5, AC-30, AC-40, AC-80, and AC-120 asphalts replacing AC-10 and AC-20 asphalts at the concentrations described in the foregoing Examples.

Example 13

This example describes a set of formulations that refer to a variety of asphalt cement types. Compositions such as those described in the foregoing examples in which the asphalt constituent is AC-10 or AC-20 asphalt are prepared with a plasticizer that is a mixture of crude oil with at least one of the AC asphalts described herein above. These asphalts include AC-1.75, AC-2.5, AC-5, AC-0, AC-20, AC-30, AC-40, AC-80, and AC-120 asphalts. The crude oil is a minority component in the plasticizer with respect to the amount of asphalt, and the plasticizer constituent is incorporated into the paving binder formulation at concentrations such as the concentrations described in the foregoing Examples.

Example 14

This example describes a set of formulations that refer to a variety of asphalt cement types. Compositions such as those described in the foregoing examples in which the asphalt constituent is AC-10 or AC-20 asphalt are prepared with a plasticizer that is a mixture of an additive of the type described below with at least one of the AC asphalts described herein above. These asphalts include AC-1.75, AC-2.5, AC-5, AC-10, AC-20, AC-30, AC-40, AC-80, and AC-120 asphalts. The additive is a minority component in the plasticizer with respect to the amount of asphalt, and the plasticizer constituent is incorporated into the paving binder formulation at concentrations such as the concentrations described in the foregoing Examples. The additive in the formulations of this Example includes at least one of the following substances: tall oil pitch, cyclic saturated hydrocarbons, cyclic unsaturated hydrocarbons, polycyclic saturated hydrocarbons, polycyclic unsaturated hydrocarbons, tar, and mixtures thereof.

Example 15

This example describes a set of formulations that refer to a variety of asphalt cement types. Compositions such as those described in the foregoing examples in which the asphalt constituent is AC-10 or AC-20 asphalt are prepared with a plasticizer that is a mixture of a polymeric material or polymerizable material of the type described below with at least one of the AC asphalts described herein above. These asphalts include AC-1.75, AC-2.5, AC-5, AC-10, AC-20, AC-30, AC-40, AC-80, and AC-120 asphalts. The polymeric or polymerizable material is a minority component in the plasticizer with respect to the amount of asphalt, and the plasticizer constituent is incorporated into the paving binder formulation at concentrations such as the concentrations described in the foregoing Examples. The polymeric or polymerizable material in the formulations of this Example includes at least one of the following materials: PET, EVA, styrene monomer (vinyl toluene), Exxon 101, and Exxon 103.

Example 16

This example describes a set of formulations that refer to a variety of asphalt cement types. Compositions such as those described in the foregoing examples in which the asphalt constituent is AC-10 or AC-20 asphalt are prepared with a plasticizer that is a mixture of a heterocyclic material of the type described below with at least one of the AC asphalts described herein above. These asphalts include AC-1.75, AC-2.75, AC-5, AC-10, AC-20, AC-30, AC-40, AC-80, and AC-120 asphalts. The heterocyclic material is a minority component in the plasticizer with respect to the amount of asphalt, and the plasticizer constituent is incorporated into the paving binder formulation at concentrations such as the concentrations described in the foregoing Examples. The heterocyclic material in the formulations of this Example includes at least one of the following materials: furan, dihydrofuran, furfural, 3-(2-furyl) acrolein, derivatives thereof, and mixtures thereof.

Example 17

This example describes a set of formulations that refer to a variety of asphalt cement types. Compositions such as those described in the foregoing examples in which the asphalt constituent is AC-10 or AC-20 asphalt are prepared with a plasticizer that is a mixture of at least one aliphatic, olefinic, or aromatic substance with at least one of the AC asphalts described herein above. These asphalts include AC-1.75, AC-2.75, AC-5, AC-10, AC-20, AC-30, AC-40, AC-80, and AC-120 asphalts. The aliphatic, olefinic, aromatic or mixture thereof is a minority component in the plasticizer with respect to the amount of asphalt, and the plasticizer constituent is incorporated into the paving binder formulation at concentrations such as the concentrations described in the foregoing Examples.

Embodiments of the paving binders according to the present invention have sulfur instead of asphalt as the majority constituent. Because of the significant compositional difference between asphalt binders and embodiments of the paving binders of the present invention, some characteristics of these paving binders are different from those of asphalt binders. In particular, the range of viscoelastic behavior of asphalt binders does not correspond with the behavior of embodiments of paving binders according to the present invention.

Pavement failures include rutting, fatigue cracking, and thermal cracking. These pavement failures are related to the physical properties of the pavement binders. Furthermore, it has also been recognized that hardening is a main factor in changing asphalt Properties during the pavement service life, thus affecting performance. In addition, it has also been realized that asphalt binders behave like viscoelastic materials. However, binder properties are complex, and sound Theological methodology is needed to study the behavior of binders. This testing and aging methods include the dynamic shear rheometer (DSR), the bending beam rheometer (BBR), and the pressure aging vessel (PAV), and the parameters include the complex shear modulus (G*), phase angle (δ), creep stiffness (S), and logarithmic creep rate (m), or m-value. These methods, parameters and functions thereof are believed to provide a good description of viscoelastic materials, such as asphalt binders.

The paving binders according to this invention, however, contain sulfur as the majority component instead of asphalt, and their viscoelastic behavior does not compare with that of asphalt binders within the same temperature range. The differences in behavior are particularly noticeable at low temperatures. Nevertheless, the parameters referred to above are still applied to embodiments of the present invention to provide reference data.

The characterization of the binder resistance to each one of the main failure modes is outlined below in three separately discussed contributions: (a) Contribution of the binder to rutting resistance; (b) contribution of the binder to fatigue cracking resistance; and (c) contribution of the binder to thermal cracking resistance.

(a) Contribution of the binder to rutting resistance

Rutting is the main failure mode at the high-temperature range from about 45° C. to about 85° C. This temperature range comprises the higher temperatures of most pavements during summer. Higher G*-values imply high total resistance to deformation and thus high rutting resistance. Lower δ-values represent a more elastic (recoverable) component of the total deformation and thus are associated with higher rutting resistance. Consequently, the paving binder contribution to rutting resistance can be increased by increasing its total resistance to deformation (increasing G*) and/or by decreasing its non-elasticity (sin δ). Instead of using G* and δ separately, it is common practice to use the ratio G*/sin δ to reflect the binder's contribution to rutting resistance, so that when the ratio G*/sin δ increases, rutting resistance also increases. This ratio is typically given in units of Pa and standard multiples thereof. Measurements are typically performed with DSR tests without subjecting the material to aging ("original") or subjected to simulated aging (typically in a rolling thin film oven ("RTFO")).

(b) Contribution of the binder to fatigue cracking resistance

Fatigue cracking is the main failure mode at the intermediate-temperature range from about 0° C. to about 45° C. Softer and more elastic paving binders are more resistant to fatigue damage because the stress developed for a given deformation is lower and the material is more capable of recovering to its pre-loading condition. In terms of G* and δ, low G*-values are associated with softer binders which deform without developing large stresses, and thus are more resistant to fatigue cracking; low δ-values are associated with more elastic binders, which are capable of recovering to their original condition without dissipating energy in any fashion, thus favoring fatigue cracking resistance. Instead of using G* and δ separately, it is common practice to use the product G* sin δ to reflect the binder's contribution to rutting resistance, so that when the product G* sin δ decreases, fatigue cracking resistance also increases. This product is typically given in units of Pa and standard multiples thereof. Measurements are typically performed with DSR tests of material subjected to aging (typically in a pressure aging vessel ("PAV")).

(c) Contribution of the binder to thermal cracking resistance

Fatigue cracking is the main failure mode at the low-temperature range from about −50° C. to about 0° C. Because stiffness is directly proportional to G*, lower G*-values are associated with asphalt binders that offer a better thermal cracking resistance. In contrast, thermal cracking resistance increases as δ increases, because the rate of relaxation is directly related to δ and a higher relaxation rate is favorable to thermal cracking resistance. Measurements regarding contribution of asphalt binder performance to thermal cracking resistance are typically performed with BBR tests, but S and m are typically given instead of G* and δ.

Thermal cracking in pavements results from stresses developed as a consequence of the thermal shrinkage that is caused by a drop in temperature. During thermal cooling, binder stiffness increases and stress builds up on the one hand because of restraint on thermal shrinkage, but on the other hand, binder flow leads to stress relaxation. Consequently, both stiffness (S) stress relaxation are important. The logarithmic creep rate, m, is typically used as an indication of ability to flow, and thus as an indication of stress dissipation ability. More specifically, a higher m-value indicates a less elastic binder that can flow and dissipate stresses. The m-value gives a measure of the rate of stress relaxation by flow of the binder. High values of m are associated with binders that have good resistance to thermal cracking. Stiffness gives a measure of thermal stresses developed in the pavement as a result of thermal shrinkage. As stiffness increases, more stresses result from a thermal strain, such as shrinkage. Low values of stiffness are associated with binders that have good resistance to thermal cracking. Stiffness and m are selected as indicators of binder contribution to pavement performance at low temperatures. However, both stiffness and m are functions of the loading time, and existing correlations with thermal cracking are only available for impractically long times, which would require impermissibly long tests. To avoid this problem and to be able to run short-time tests, the time-temperature superposition principle has been adopted as a standard practice, so that the tests are performed at higher temperature but for shorter loading times. In particular, it is known that a 10° C. increase in temperature is equivalent to a loading time shift from 7200 s to about 60 s. Accordingly, a specification criterion of a minimum m-value of 0.30, and a maximum limit of 300 MPa on the stiffness were selected as SHRP viscoelastic binder specifications, where both values are taken at a loading time of 60 s.

The relationships between failure modes and viscoelastic material characteristic parameters can be summarized as follows. Increased G* values and lower δ values are favorable changes with respect to rutting performance, but they are unfavorable for thermal cracking performance. For fatigue cracking in viscoelastic materials, the increase in S (or in G*) is not favorable, while the decrease in m (or in δ) is generally favorable.

The foregoing discussion refers to aging in rotatory thin film oven and in pressure aging vessel. Binder aging is briefly discussed as follows. The asphaltic material in paving binders typically hardens when the paving binder and the aggregate are mixed in hot-mix plants. Tests have been devised to simulate this hardening, and these tests include the Thin Film Oven (TFO) test, ASTM D1754, and the Rolling Thin Film Oven (RTFO) test, ASTM D2872. The RTFO test is currently more commonly used because it is designed to produce in about 75 minutes results similar to those produced by the TFO test in about 5 hours. In essence, these tests simulate by oven aging the hardening that occurs in hot-mix plants. SHRP proposed the Pressure Aging Vessel (PAV) as an aging procedure to simulate long-term field oxidative aging of asphalt binders.

Regarding compositions, Tables 1–3 display test results for one embodiment of paving binder that had been manufactured according to the present invention with 60% sulfur, 20% AC-20 asphalt from California Valley, and 20% fly ash.

TABLE 1

| T/° C. | m | Stiffness/MPa |
|---|---|---|
| −16 | 0.396 | 144 |
| −22 | 0.321 | 355 |
| −28 | 0.223 | 710 |

TABLE 2

| (G*/sin δ)/kpa at three high temperatures | | | |
|---|---|---|---|
| Conditions | 64° C. | 70° C. | 76° C. |
| ORIGINAL | 4.49 | 2.10 | 1.04 |
| RTFO | 10.20 | 4.60 | 2.12 |

TABLE 3

| (G* sin δ)/MPa at four intermediate temperatures | | | | |
|---|---|---|---|---|
| Conditions | 31° C. | 28° C. | 25° C. | 22° C. |
| PAV | 2.24 | 3.31 | 4.66 | 6.61 |

Tables 4–5 display test results for an embodiment of paving binder that had been manufactured according to the present invention with 70% sulfur, 15% AC-20 asphalt from Cold Lake, Canada, and 15% fly ash.

TABLE 4

| T/° C. | m | Stiffness/MPa |
|---|---|---|
| −16 | 0.281 | 365 |
| −22 | 0.161 | 577 |
| −28 | 0.173 | 972 |

TABLE 5

| (G*/sin δ)/kPa at three high temperatures | | | |
|---|---|---|---|
| Conditions | 70° C. | 76° C. | 82° C. |
| ORIGINAL | 6.59 | 3.30 | 1.69 |
| RTFO | 9.77 | 5.26 | 2.69 |

Tables 6–8 display test results for an embodiment of paving binder that had been manufactured according to the present invention with 80% sulfur, 10% AC-20 asphalt from Cold Lake, Canada, and 10% fly ash.

TABLE 6

| T/° C. | m | Stiffness/MPa |
|---|---|---|
| −16 | 0.338 | 150 |
| −22 | 0.193 | 220 |
| −28 | 0.018 | 48 |

TABLE 7

| (G*/sin δ)/kpa at four high temperatures | | | |
|---|---|---|---|
| Conditions | 52° C. | 58° C. | 64° C. |
| ORIGINAL | 3.54 | 1.51 | 0.63 |
| RTFO | 18.3 | 7.88 | 3.31 |

TABLE 8

| (G* sin δ)/MPa at three intermediate temperatures | | | |
|---|---|---|---|
| Conditions | 31° C. | 28° C. | 25° C. |
| PAV | 3.12 | 4.43 | 5.76 |

Tables 9–11 display test results for an embodiment of paving binder that had been manufactured according to the present invention with 60% sulfur, 20% AC-20 asphalt from Gulf Coast, Texas, and 20% fly ash.

TABLE 9

| T/° C. | m | Stiffness/MPa |
|---|---|---|
| −16 | 0.340 | 178 |
| −22 | 0.198 | 217 |
| −28 | 0.180 | 567 |

TABLE 10

| (G*/sin δ)/kPa at three high temperatures | | | |
|---|---|---|---|
| Conditions | 52° C. | 58° C. | 64° C. |
| ORIGINAL | 3.65 | 1.52 | 0.644 |
| RTFO | 10.1 | 4.14 | 1.67 |

TABLE 11

| (G* sin δ)/MPa at three intermediate temperatures | | | |
|---|---|---|---|
| Conditions | 31° C. | 28° C. | 25° C. |
| PAV | 3.46 | 4.91 | 7.01 |

Tables 1, 4, 6, and 9 display BBR test results at several low temperatures, a temperature range at which thermal cracking is considered to be the main failure mode. Tables 2, 5, 7, and 10 display DSR tests of materials under original and RTFO conditions at several high temperatures, a temperature range at which rutting is considered to be the main failure mode. Tables 3, 8, and 11 display DSR tests of materials under PAV conditions at several intermediate temperatures, a temperature range at which fatigue cracking is considered to be the main failure mode.

Values of the ratio G*/sin δ shown in Tables 2, 5, 7, and 10 indicate that the paving binders according to the present invention generally present good rutting resistance according to interpretive criteria applied to viscoelastic materials.

Values of the product G* sin δ shown in Tables 3, 8, and 11 indicate that the paving binders according to the present invention generally present good fatigue cracking resistance according to interpretive criteria applied to viscoelastic materials.

Stiffness and m-values shown in Tables 1, 4, 6, and 9 can be interpreted as indicating that the paving binders according to the present invention generally present good thermal cracking resistance according to interpretive criteria applied to viscoelastic materials for moderately low temperatures.

Embodiments of the paving binder of the present invention confer good thermal cracking resistance to pavement in the low temperature zone because of the high strength of these paving binders. This strength prevents the development of cracks as a consequence of stress accumulation upon cooling.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A paving binder which is obtained by mixing substances comprising:
    (a) a non-detrimental fine mineral constituent, the fine mineral constituent being substantially comprised of silica materials;
    (b) a hydrocarbon-based plasticizer; and
    (c) sulfur which is incorporated into the mixture in a weight percentage of at least 60%,
    wherein said mixture of said mineral constituent, said plasticizer and said sulfur is a single-phase homogeneous mixture.

2. A paving binder as recited in claim 1, wherein said hydrocarbon-based plasticizer is selected from the group consisting of AC-10 asphalt, AC-20 asphalt, and mixtures thereof.

3. A paving binder as recited in claim 1, wherein said hydrocarbon-based plasticizer is an AC asphalt selected from the group consisting of AC- 1.75 asphalt, AC-2.75 asphalt, AC-5 asphalt, AC-30 asphalt, AC-40 asphalt, AC-80 asphalt, AC-120 asphalt, and mixtures thereof.

4. A paving binder as recited in claim 1, wherein said hydrocarbon-based plasticizer is obtained by mixing ingredients including an AC asphalt substance selected from the group consisting of AC-10 asphalt, AC-20 asphalt, mid mixtures thereof, with at least one of the substances selected from the group consisting of tall oil pitch, cyclic saturated hydrocarbons, cyclic unsaturated hydrocarbons, polycyclic saturated hydrocarbons, polycyclic unsaturated hydrocarbons, tar, and mixtures hereof, wherein said AC asphalt substance is a majority component in said ingredients.

5. A paving binder as recited in claim 1, wherein said hydrocarbon-based plasticizer is obtained by mixing ingredients including an AC asphalt substance selected from the group consisting of AC-1.75 asphalt, AC-2.5 asphalt, AC-5 asphalt, AC-30 asphalt, AC-40 asphalt, AC-80 asphalt, AC-120 asphalt, and mixtures thereof, with at least one of the substances selected from the group consisting of tall oil pitch, cyclic saturated hydrocarbons, cyclic unsaturated hydrocarbons, polycyclic saturated hydrocarbons, polycyclic unsaturated hydrocarbons, tar, and mixtures thereof, wherein said AC asphalt substance is a majority component in said ingredients.

6. A paving binder as recited in claim 1, wherein said hydrocarbon-based plasticizer is obtained by mixing ingredients including an AC asphalt substance selected from the group consisting of AC-10 asphalt, AC-20 asphalt, and mixtures thereof, with at least one of the heterocyclic substances selected from the group consisting of furan, dihydrofuran, furfural, 3-(2-furyl) acrolein, and mixtures thereof; wherein said AC asphalt substance is a majority component in said ingredients.

7. A paving binder as recited in claim 1, wherein said hydrocarbon-based plasticizer is obtained by mixing ingredients including an AC asphalt substance selected from the group consisting of AC-1.75 asphalt, AC-2.5 asphalt, AC-5 asphalt, AC-30 asphalt, AC-40 asphalt, AC-80 asphalt, AC-120 asphalt, and mixtures thereof, with at least one of the heterocyclic substances selected from the group consisting of furan, dihydrofuran, furfural, 3-(2-furyl) acrolein, and mixtures thereof, wherein said AC asphalt substance is a majority component in said ingredients.

8. A paving binder as recited in claim 1, wherein said hydrocarbon-based plasticizer is obtained by mixing ingredients including an AC asphalt substance selected from the group consisting of AC-10 asphalt, AC-20 asphalt, and mixtures thereof, with at least one substance in the group consisting of an aliphatic, olefinic or aromatic substance, wherein said AC asphalt substance is a majority component in said ingredients.

9. A paving binder as recited in claim 1, wherein said hydrocarbon-based plasticizer is obtained by mixing ingredients including an AC asphalt substance selected from the group consisting of AC-1.75 asphalt, AC-2.5 asphalt, AC-5 asphalt, AC-30, asphalt, AC-40 asphalt, AC-80 asphalt, AC-120 asphalt, and mixtures thereof, with at least one substance in the group consisting of an aliphatic, olefinic, or aromatic substance, wherein said AC asphalt substance is a majority component in said ingredients.

10. A paving binder which is obtained by mixing substances comprising:
(a) a non-detrimental fine mineral constituent which consists substantially of fly ash, silica material, or mixtures thereof;
(b) a hydrocarbon-based plasticizer which comprises AC asphalt; and
(c) sulfur which is incorporated into the mixture in a weight percentage of at least 60%,
wherein said mixture of said mineral constituent, said plasticizer and said sulfur is a single-phase homogeneous mixture.

11. A paving binder as recited in claim 10, wherein said fine mineral constituent is sized as to pass through a 200 mesh sieve.

12. A paving binder as recited in claim 10, wherein said hydrocarbon-base plasticizer is obtained by mixing ingredients including an AC asphalt, with at least one of the substances selected from the group consisting of tall oil pitch, cyclic saturated hydrocarbons, cyclic unsaturated hydrocarbons, polycyclic saturated hydrocarbons, polycyclic unsaturated hydrocarbons, tar, and mixtures thereof, wherein said AC asphalt substance is a majority component in said ingredients.

13. A paving binder as recited in claim 10, wherein said hydrocarbon-based plasticizer is obtained by mixing ingredients including an AC asphalt, with at least one of the heterocyclic, substances selected from the group consisting of furan, dihydrofuran, furfural, 3-(2-furyl) acrolein, and mixtures thereof, wherein said AC asphalt substance is a majority component in said ingredients.

14. A paving binder as recited in claim 10, wherein said hydrocarbon-based plasticizer is obtained by mixing ingredients including an AC asphalt, with at least one substance in the group consisting of an aliphatic, olefinic, or aromatic substance, wherein said AC asphalt substance is a majority component in said ingredients.

15. A paving binder which is obtained by mixing substances comprising:
(a) a non-detrimental fine mineral constituent which consists substantially of fly ash, silica material, or mixtures thereof, wherein said fine mineral constituent is sized as to pass through a 200 mesh sieve;
(b) a hydrocarbon-based plasticizer which comprises AC asphalt, wherein said hydrocarbon-based plasticizer is mixed in a weight percentage amount within the range from about 1% to about 30%; and
(c) sulfur which is mixed in a weight percentage amount in the range from about 60% to about 98%,
wherein said mixture of said mineral constituent, said plasticizer and said sulfur is a single-phase homogeneous mixture.

16. A paving binder as recited in claim 15, wherein said fine mineral constituent is mixed in a weight percentage amount within the range from about 1% to about 33%.

17. A paving binder which is obtained by mixing substances comprising:
(a) a non-detrimental fine mineral constituent which consists substantially of fly ash, silica material, or mixtures thereof, wherein said fine mineral constituent is sized as to pass through a 200 mesh sieve;
(b) a hydrocarbon-based plasticizer which comprises AC asphalt, wherein said hydrocarbon-based plasticizer is mixed in a weight percentage amount within the range from about 2.5% to about 20%; and
(c) sulfur which is mixed in a weight percentage amount in the range from about 70% to about 90%,
wherein said mixture of said mineral constituent, said plasticizer and said sulfur is a single-phase homogeneous mixture.

18. A paving binder as recited in claims 17, wherein, said fine mineral constituent is mixed in a weight percentage amount within the range from about 2.5% to about 20%.

19. A paving binder which is obtained by mixing substances comprising:
(a) a non-detrimental fine mineral constituent which consists substantially of fly ash, silica material, or mixtures thereof, wherein said fine mineral constituent is sized as to pass through a 200 mesh sieve;
(b) a hydrocarbon-based plasticizer which comprises AC asphalt, wherein said hydrocarbon-based plasticizer is mixed in a weight percentage amount within the range from about 5% to about 12%, and
(c) sulfur which is mixed in a weight percentage amount in the range from about 75% to about 90%,
wherein said mixture of said mineral constituent, said plasticizer and said sulfur is a single-phase homogeneous mixture.

20. A paving binder as recited in claims 19, wherein, said fine mineral constituent is mixed in a weight percentage amount within the range from about 5% to about 12%.

21. A method for manufacturing paving binder comprising:
(a) providing ingredients that include liquid sulfur, liquid hydrocarbon-based plasticizer, and a non-detrimental fine mineral constituent, the fine mineral constituent consisting substantially of silica materials, fly ash or a mixture thereof,
(b) mixing said ingredients in controlled amounts, such that the weight percentage of sulfur mixed is at least 60% with respect to all the ingredients in the mixture, so that said mixing provides a single-phase homogeneous fluid mixture of said ingredients; and
(c) cooling said fluid mixture so that it becomes a solid.

22. A method as recited in claim 21, further comprising comminuting said solid into slates.

23. A method as recited in claim 21, further comprising comminuting said solid into chips.

24. A method as recited in claim 21, further comprising pastilling said fluid mixture into solid pastilles.

25. A method as recited in claim 21, further comprising pelletizing said fluid mixture into solid pellets.

26. A method as recited in claim 21, wherein said mixing comprises the mixing of said ingredients together in the same mixing vessel.

27. A method as recited in claim 21, wherein said mixing comprises the mixing of said liquid hydrocarbon-based plasticizer with said fine mineral constituent to form a mastic material, and the mixing of said mastic material with said liquid sulfur to form said fluid mixture.

28. A method as recited in claim 21, wherein said mixing comprises the wetting of said fine mineral constituent and the subsequent mixing with said liquid hydrocarbon-based plasticizer to form a mastic material, and the mixing of said mastic material with said liquid sulfur to form said fluid mixture.

29. A method as recited in claim 21, further comprising preplasticizing said liquid sulfur.

30. A method as recited in claim 21, further comprising preplasticizing said liquid hydrocarbon-based plasticizer.

31. A paving binder which is obtained by mixing substances comprising:
- (a) a non-detrimental fine mineral constituent that is essentially free from any calcium-based mineral fillers with a low density and comprises mainly silica materials;
- (b) a hydrocarbon-based plasticizer; and
- (c) sulfur which is incorporated into the mixture in a weight percentage of at least 60%, wherein said mixture of said mineral constituent, said plasticizer and said sulfur is a single-phase homogeneous mixture.

32. A paving binder which is obtained by mixing substances comprising:
- (a) a non-detrimental fine mineral constituent that is substantially free from calcium hydroxide and comprises mainly silica materials,
- (b) a hydrocarbon-based plasticizer; and
- (c) sulfur which is incorporated into the mixture in a weight percentage of at least 60%, wherein said mixture of said mineral constituent, said plasticizer and said sulfur is a single-phase homogeneous mixture.

33. A paving binder which is obtained by mixing substances comprising:
- (a) a non-detrimental fine mineral constituent that is essentially free from calcium oxide and comprises mainly silica materials,
- (b) a hydrocarbon-based plasticizer; and
- (d) sulfur which is incorporated into the mixture in a weight percentage of at least 60%, wherein said mixture of said mineral constituent, said plasticizer and said sulfur is a single-phase homogeneous mixture.

* * * * *

UNITED STATES PATENT AND TRADEMARK OFFICE
CERTIFICATE OF CORRECTION

PATENT NO. : 6,440,205 B1
DATED : August 27, 2002
INVENTOR(S) : William R. Bailey, Norm D. Pugh and William C. McBee It is certified that error appears in the above-identified patent and that said Letters Patent is hereby corrected as shown below:

Column 20,
Line 8, delete "AC-2.75 asphalt" and insert -- AC-2.5 asphalt --.

Signed and Sealed this

Seventh Day of June, 2005

JON W. DUDAS
*Director of the United States Patent and Trademark Office*